Aug. 7, 1945.                 D. DIETZ                  2,381,489
                            CARCASS SAW
                        Filed Sept. 13, 1943
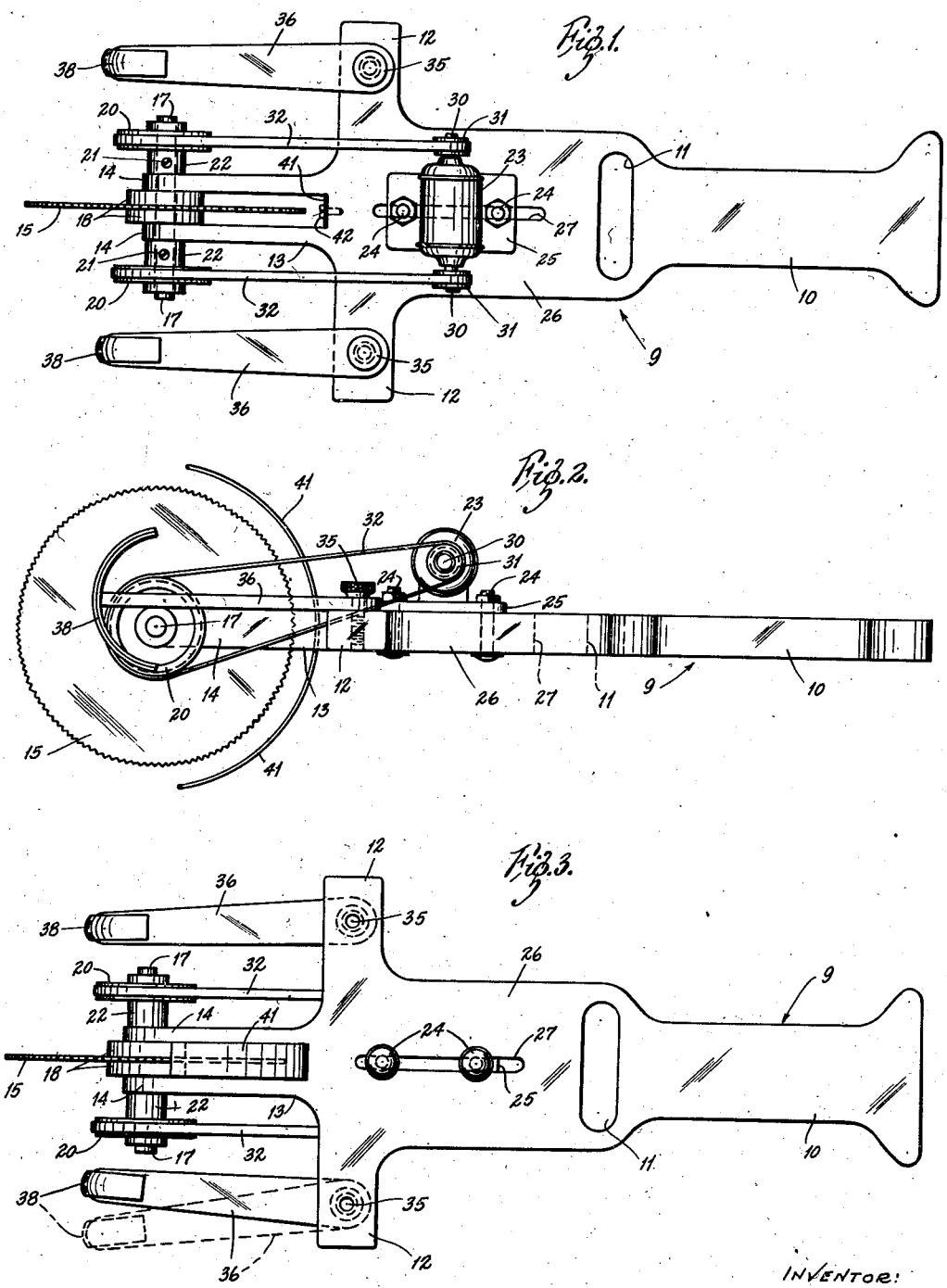
INVENTOR:
DOUGLAS DIETZ,
ATTORNEYS.

Patented Aug. 7, 1945

2,381,489

UNITED STATES PATENT OFFICE 2,381,489

CARCASS SAW

Douglas Dietz, Smithton, Ill.

Application September 13, 1943, Serial No. 502,103

6 Claims. (Cl. 17—23)

The present invention relates generally to power driven saws, and more particularly to such saws adapted to be used for cutting carcasses of animals.

While the art contains examples of power saws for splitting a meat carcass by severing through the back bone, difficulty has been experienced in properly guiding the saw to prevent lateral cutting during the operation. The carcass of meat animals have grooves or declivities at each side of the back bone, but the lateral spacing of these vary widely with different animals, and in carcasses of different sizes.

An object of the invention is to provide a saw that may be easily actuated to split the carcasses in preparing the same for the market, which may be adjusted for use upon carcasses of various meat animals, and which will accurately guide the saw to prevent lateral cutting of the carcass.

Another object is to provide such a saw for cutting down the backbone of an animal, the device having guides adapted to ride in the declivities at the sides of the backbone and, without injury to the meat, to hold the saw at the center of the back.

Fig. 1 is a plan view of the invention;

Fig. 2 is a side view of the device; and,

Fig. 3 is a bottom view.

In general, the device comprises a frame, a motor mounted thereon, guide supporting arms pivotally mounted on laterally projecting portions or wings of the frame, and a rotor saw mounted in a forwardly projecting yoke portion of the frame.

More particularly, the frame 9 comprises a handle 10, a cut-out section 11, through which fingers of the operator may be inserted, lateral extensions 12, and a yoke 13 comprising the two forwardly extending members 14.

A rotor saw 15 is fixed to the axle 17, mounted in the ends of the yoke consisting of the two members 14. The saw 15 has a hub 18 which is secured to the axle. The axle 17 extends beyond yoke members 14 to mount pulleys 20 which are secured to the axle 17 by means of pins 21 extending through one side of each hub 22 of the pulleys 20.

A motor 23 is mounted on the frame by means of bolts 24 that extend through the motor base plate 25 and the body 26 of the frame 9. The bolts operate in a slot 27, in member 26, so that the motor may be adjusted longitudinally of the frame to serve as a means for tightening the power belts of the motor. Projecting beyond both sides of this motor is a shaft 30, at the ends of which are mounted power pulleys 31. Any suitable flexible connections, such as belts 32, connect the pulleys 31 and 20.

The wiring and switch for the motor 27, forming no part of this invention, are not shown.

Pivotally mounted near the extremities of the laterally extending wings 12, by means of thumb screws 35, are guide bearing arms 36. These arms may be set in any position by the tightening of the thumb screws 35. Mounted at the ends of arms 36 are guide members 38. The members 38 are curved both laterally and longitudinally.

A guard 41, mounted at the inner end of the yoke formed by the members 14 by means of screw 42, protects the operator from flying material, and prevents contact with the rear portion of the rotor saw 15.

In using this carcass saw, the operator grasps the handle 10 with his left hand and extends the fingers of his right hand through the finger hole 11 to steady the device. The motor, having been turned on, revolves the saw 15 by means of pulleys 20 and 31 and belts 32. The saw is used to cut directly down the backbone of an animal, the guide arms having been set to position the guides 38 to ride in the declivities adjacent to the backbone of the animal, holding the saw at the center of the back. It will be understood that the guides are set to ride in the grooves at either side of the backbone, therefore, the carcass may be readily split upon a proper line, and the saw will be prevented from side deflection, thereby avoiding cutting the carcass laterally.

What I claim is:

1. In a saw of the class described, the combination of a frame member including a hand hold, a body portion, lateral guide supporting arms and a yoke, of a saw journalled for rotation in the yoke, a motor supported by the body portion operatively connected with the saw, laterally adjustable guide arms mounted on said supporting arms extending forwardly substantially parallel with opposite faces of the saw, and curved guide members supported at the extremity of said arms and adapted to serve as means for guiding the saw and to prevent lateral deflection thereof.

2. In a power saw of the class described, the combination of a frame member, a saw mounted for rotation therein, power means supported by the frame for operating the saw, means for guiding the saw, comprising arms pivoted to the frame, located on opposite sides of the saw and movable toward and from the opposite faces of the saw, and plates curved longitudinally and laterally carried by said arms.

3. In a carcass power saw, a frame, a motor mounted on said frame, said frame including a forwardly extending yoke and laterally extending wings, an axle mounted in said yoke, a rotor saw fixedly mounted on said axle between the members of said yoke, means for rotating said axle by said motor, arms pivoted to said wings, means to tighten the pivotal connections of said arms to said wings, guides on the outer ends of said arms, said guides being curved both laterally and longitudinally, whereby said guides, without injury to the meat, may run along the surface of a cascass to guide said rotor saw.

4. In a power saw, a frame, a motor mounted on said frame, a shaft in said motor, said frame having a forwardly extending yoke, an axle mounted in said yoke, a rotor saw fixed to said axle, means for driving said rotor saw by the revolution of said motor axle, and means for guiding said saw comprising arms pivoted to said frame, means for holding said arms in selected lateral adjustments, and guides at the outer ends of said arms.

5. In a power carcass saw, a frame, a rotor saw mounted on said frame, and means for guiding said raw comprising arms pivoted to said frame, means for holding said arms in selected lateral adjustments, and guides at the outer ends of said arms, said guides being curved both laterally and longitudinally, whereby said guides, without injury to the meat, may run along the surface of a carcass to guide said rotor saw.

6. In a power saw, the combination of a frame member, a rotor saw mounted for rotation on the frame, power means supported by the frame and connected to drive the saw, and means for guiding the saw, said means including an arm mounted on the frame and positioned to extend along one side of the saw to a point rearwardly of the forward edge of the saw, means for adjusting the arm so as to vary its lateral relation with respect to the saw, and a guide member carried by the end of the arm for engaging the surface of the member being cut, said guide means being so constructed and mounted as to move over the engaged surface without injury thereto.

DOUGLAS DIETZ.